(12) United States Patent
Kim

(10) Patent No.: US 10,869,243 B2
(45) Date of Patent: Dec. 15, 2020

(54) METHOD FOR CONFIGURING CENTRAL UNIT BY USING FRONTHAUL INTERFACE, AND DEVICE FOR SAME

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 12 days.

(21) Appl. No.: 16/316,092

(22) PCT Filed: Jul. 12, 2017

(86) PCT No.: PCT/KR2017/007452
§ 371 (c)(1),
(2) Date: Jan. 8, 2019

(87) PCT Pub. No.: WO2018/012873
PCT Pub. Date: Jan. 18, 2018

(65) Prior Publication Data
US 2019/0342809 A1    Nov. 7, 2019

(30) Foreign Application Priority Data
Jul. 13, 2016   (KR) .................. 10-2016-0088331

(51) Int. Cl.
*H04W 36/12* (2009.01)
*H04L 5/00* (2006.01)
(Continued)

(52) U.S. Cl.
CPC ........... *H04W 36/12* (2013.01); *H04L 5/0048* (2013.01); *H04L 41/0813* (2013.01);
(Continued)

(58) Field of Classification Search
CPC . H04W 36/0058; H04W 36/12; H04W 88/08; H04W 36/0055; H04W 36/06;
(Continued)

(56) References Cited

U.S. PATENT DOCUMENTS 9,998,310 B2 *   6/2018   Barbieri .................. H04L 29/06
10,009,803 B2 *  6/2018   Dahod ............. H04W 36/0055
(Continued)

FOREIGN PATENT DOCUMENTS

| JP | 2016-520272 A | 7/2016 |
|----|---------------|--------|
| KR | 10-2016-0042923 A | 4/2016 |
| WO | 2016/008361 A1 | 1/2016 |

OTHER PUBLICATIONS

Sun Gi Park et al., "Study on System of Next-generation Cloud Base Station for Supporting Multi-mode Multi-layered Cells", Information and Communications Magazine, vol. 31, No. 3, Feb. 2014, pp. 85-95.
(Continued)

*Primary Examiner* — Man U Phan
(74) *Attorney, Agent, or Firm* — IP Legal Services, LLC

(57) ABSTRACT

Provided are a method and a device for configuring a central unit and a distributed unit for a 5th generation (5G) wireless access network base station configuration. In particular, the method of a central unit (CU) for communicating with a terminal may include receiving network function configuration information of a distributed unit (DU) connected to the CU by using a fronthaul interface, configuring a network function of the CU on the basis of the network function configuration information of the DU, and transmitting data to a terminal through the DU.

14 Claims, 9 Drawing Sheets

(51) Int. Cl.
  *H04L 12/24* (2006.01)
  *H04L 29/08* (2006.01)
  *H04W 36/00* (2009.01)
  *H04W 88/08* (2009.01)

(52) U.S. Cl.
  CPC ......... *H04L 67/10* (2013.01); *H04W 36/0055* (2013.01); *H04W 88/08* (2013.01)

(58) Field of Classification Search
  CPC ... H04W 88/085; H04W 92/20; H04W 36/00; H04L 5/0057; H04L 67/10; H04L 41/0813; H04L 5/0048; H04L 29/08; H04L 12/24; H04L 5/00
  USPC .......................................................... 370/254
  See application file for complete search history.

(56) References Cited

U.S. PATENT DOCUMENTS

| | | | | |
|---|---|---|---|---|
| 10,231,254 B2 * | 3/2019 | Chen | ................ | H04W 72/1273 |
| 10,231,256 B2 * | 3/2019 | Checko | ................ | H04L 43/50 |
| 10,244,507 B2 * | 3/2019 | Tarlazzi | ................ | H04W 72/042 |
| 10,348,386 B1 * | 7/2019 | Nammi | ................ | H04B 7/0857 |
| 10,355,895 B2 * | 7/2019 | Barbieri | ................ | H04W 72/0413 |
| 10,541,739 B1 * | 1/2020 | Nammi | ................ | H04W 52/242 |
| 10,608,734 B2 * | 3/2020 | Barbieri | ................ | H04B 7/15507 |
| 10,616,016 B2 * | 4/2020 | Fertonani | ................ | H04W 72/0413 |
| 10,727,925 B2 * | 7/2020 | Wang | ................ | H04W 36/06 |
| 2014/0226481 A1 * | 8/2014 | Dahod | ................ | H04W 72/04 370/235 |
| 2016/0021552 A1 | 1/2016 | Xu et al. | | |
| 2016/0094447 A1 | 3/2016 | Wang et al. | | |
| 2016/0242147 A1 * | 8/2016 | Tarlazzi | ................ | H04W 72/04 |
| 2016/0270006 A1 | 9/2016 | Choi et al. | | |
| 2019/0222291 A1 * | 7/2019 | Wang | ................ | H04B 7/0695 |

OTHER PUBLICATIONS

Myunghwan Kim et al., "Wireless Access Network Architecture and Virtualization Scenarios for Next-Generation Mobile Communication Networks", Journal of the Korea Institute of Information and Communication Engineering, vol. 16, No. 10, Oct. 2012, pp. 2150-2162.

* cited by examiner

METHOD FOR CONFIGURING CENTRAL UNIT BY USING FRONTHAUL INTERFACE, AND DEVICE FOR SAME

CROSS REFERENCE TO RELATED APPLICATIONS

This application is a National Stage Patent Application of PCT International Patent Application No. PCT/KR2017/007452 (filed on Jul. 12, 2017) under 35 U.S.C. § 371, which claims priority to Korean Patent Application No. 10-2016-0088331 (filed on Jul. 13, 2016), the teachings of which are incorporated herein in their entireties by reference.

TECHNICAL FIELD

The present embodiments relate to a method for configuring a central unit and a distributed unit for a $5^{th}$ generation (5G) wireless access network base station configuration, and a device therefor.

BACKGROUND ART

A wireless base station using typical long term evolution (LTE) communication technology includes a network function including various layers in one base station. In addition, the wireless base station may be divided into a digital unit (DU) and a radio unit (RU), wherein the DU performs physical layer, medium access control (MAC), radio link control (RLC), and radio resource control (RRC) functions, and the RU installed at a cell site performs an radio frequency (RF) function.

That is, the DU configures and performs functions related to data processing, and the RU is installed in an individual cell site to perform a wireless transmission/reception function.

The DU and the RU are connected by an interface based on a common public radio interface (CPRI) interface, but there is a problem that it is difficult to ensure intercompatibility if the manufacturers of the units are different.

In addition, in a $5^{th}$ generation (5G) technology, various transmission speeds, reliability, delay requirements, and various services are required to be provided. This is to provide a customized service for each location or terminal, and various types of service providing devices (e.g., base stations) are needed.

For this, the various types of base stations are required to be dynamically configured for each location or each service. In addition, when the various types of base stations are configured, intercompatibility between base station apparatuses is very important.

DETAILED DESCRIPTION OF THE INVENTION

Technical Problem

Therefore, the present disclosure has been made in view of the above-mentioned problems, and an aspect of the present disclosure is to provide various types of base station configurations.

Also, another aspect of the present disclosure is to provide a method and device for configuring a base station dynamic function based on a fronthaul interface in order to satisfy compatibility of various base station separation structures in which functions of a base station are separated.

Technical Solution

In accordance with an aspect of the present disclosure, a method may be provided for enabling a central unit (CU) to communicate with a terminal. The method may include: receiving network function configuration information of a distributed unit (DU) connected to the CU by using a fronthaul interface; configuring a network function of the CU on the basis of the network function configuration information of the DU; and transmitting data to the terminal through the DU.

In accordance with another aspect of the present disclosure, a central unit (CU) may be provided for communicating with a terminal, including: a receiver configured to receive network function configuration information of a DU connected to the CU by using a fronthaul interface; a controller configured to configure a network function of the CU on the basis of the network function configuration information of the DU; and a transmitter configured to transmit data to the terminal through the DU.

Advantageous Effects

In accordance with embodiments of the present disclosure, network functions of a central unit (CU) and a distributed unit (DU) may be dynamically configured. Accordingly, a base station may be configured dynamically to satisfy various requirements.

In addition, intercompatibility between a DU and a CU of various structures may be maintained using a standardized fronthaul interface and a data transmission/reception method in accordance with embodiments of the present disclosure.

MODE FOR CARRYING OUT THE INVENTION

Figure 1:
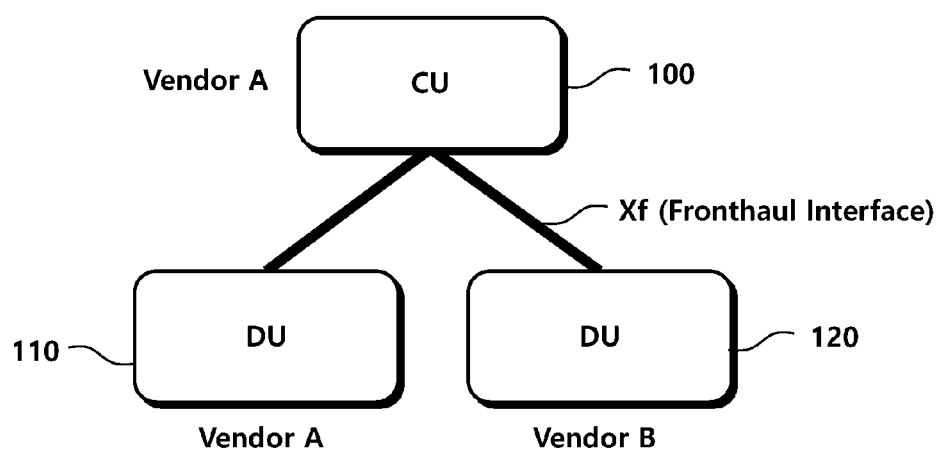
FIG. 1 is a diagram illustrating a structure of a base station according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication. The user equipment may include a UE (User Equipment) in wideband code division multiple access (WCDMA), long term evolution (LTE), high speed packet access (HSPA), and an MS (Mobile station), a UT (User Terminal), an SS (Subscriber Station), a wireless device in global systems for mobile communication (GSM).

A base station or a cell may generally refer to a station performing communication with a User Equipment (UE). The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device itself that provides a megacell, a macrocell, a microcell, a picocell, a femtocell, and a small cell in association with a wireless area, or ii) the base station may indicate a wireless area itself. In i), the base station may be all devices that interact with one another and is controlled by an identical entity to provide a corresponding wireless service area or all devices that cooperate each other to configure the wireless service area. Based on a configuration type of a wireless service area, a base station may be referred to as an eNB, an RRH, an antenna, an RU, a Low Power Node (LPN), a point, a transmission/reception point, a transmission point, a reception point, and the like. In ii), a base station may be a wireless area itself where a terminal or a base station receives a signal from or transmits a signal to the other terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, but embodiments thereof may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field and may include all technical fields in which the technical idea of the present disclosure is applicable.

Uplink transmission and downlink transmission may be performed i) based on a TDD (Time Division Duplex) scheme that performs transmission based on different times or ii) based on an FDD (Frequency Division Duplex) scheme that performs transmission based on different frequencies.

Further, a related standard may define an uplink and a downlink to be configured based on a single carrier or a pair of carriers in a system such as LTE and LTE-A. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission and reception through a PUCCH, a PUSCH, a PDCCH, an EPDCCH, or a PDSCH may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. Furthermore, the physical downlink control channel may indicate a meaning including both a PDCCH and an EPDCCH.

In addition, for ease of description, an EPDCCH according to an embodiment of the present disclosure may be applied to the part described using a PDCCH as well as the part described using an EPDCCH.

Meanwhile, higher layer signaling includes an radio resource control (RRC) signaling that transmits RRC information including an RRC parameter.

An eNB executes downlink transmission to terminals. The eNB may transmit a Physical Downlink Shared Channel (PDSCH) which is a primary physical channel for unicast transmission. The eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In this specification, a base station or a $5^{th}$ generation (5G) base station may be described as including a central unit (CU) and a distributed unit (DU). For example, a 5G radio access network may be divided into a CU that is centrally installed and a DU that is installed dispersedly in a cell site. If necessary, the base station will be described as including both a CU and a DU connected to a fronthaul interface while including a network function of the CU and a network function of the DU. Alternatively, the base station may be divided into the CU, the DU, and an RU responsible for an RF function.

Meanwhile, in the present specification, the CU and the DU are arbitrarily selected terms for convenience of description based on a position where the corresponding unit is installed, but embodiments thereof are not limited to the corresponding terms. For example, the CU and the DU may have different arrangement positions and arrangement functions depending on a wireless network construction scenario, or the like. Further, the names of the CU and the DU may vary depending on the manufacturer of each unit. Accordingly, the CU in the present specification should be understood to include various names such as a data processing unit, a local office unit, a centralized station unit, a virtualization server, and the like. Similarly, in the case of the DU, it should also be understood to include various names such as a cell site unit, a radio unit, an end unit, and the like. That is, the CU and the DU in this specification refer to individual units in which base station functions are distributed while performing individual base station functions, and the names thereof are not limited.

In addition, the fronthaul interface is used to denote the interface of the CU and the DU, and can be understood as being distinguished from a backhaul interface, which is an interface connecting a core network and the CU. Of course, the fronthaul interface is also an arbitrary term for being distinguished from the backhaul interface, and refers to an interface for connecting the CU and the DU, and the embodiments thereof are not limited thereto.

The following 5G or 5G communication scheme should be understood as a generic term for the communication schemes under study in order to transmit a larger amount of data faster than LTE-Advanced. That is, the 5G may refer to a specific communication scheme, or may refer to a part of the function for large-capacity high-speed data communication or the entire communication system. Accordingly, the 5G in this specification should be understood to mean a communication system or a communication function for performing a large-capacity high-speed communication.

The present disclosure relates to a method for configuring a CU and a DU using a fronthaul interface of a 5G base station having various types of base station separation structures and a device therefor.

FIG. 1 is a diagram illustrating a structure of a base station according to an embodiment.

Referring to FIG. 1, a 5G radio access network (RAN) may be divided into a CU 100 mainly installed in a centralized station and DUs 110 and 120 installed in a cell site. One CU may be connected to one or more DUs 110 and 120 to configure a base station.

For example, the CU 100 may be connected to the DU 110 manufactured by a vendor A and the DU 120 manufactured by a vendor B. The CU 100 and the DUs 110 and 120 may be manufactured/installed by the same vendor or different vendors. In this case, the CU 100 and the DU 110 may be configured by the same vendor, and the CU 100 and the DU 120 may be configured by different vendors.

The CU 100 and each of the DUs 110 and 120 may be connected to each other through a fronthaul interface. Hereinafter, the fronthaul interface, which is a connection interface between the CU 100 and the DUs 110 and 120, will be described as Xf. If necessary, the fronthaul may be described as a midhaul.

An radio frequency (RF) or antenna function may be included in the DUs 110 and 120, or may be separately divided. When the RF or antenna function is divided, a base station may be designed with a three-phase separation structure of the CU 100, the DU 110 and 120, and RF/antenna (not shown).

In at least one of embodiments, the base station may be implemented with a baseband function and independent network functions (NFs) in the form of PHY, MAC, RLC, PDCP, and RRC, in a virtualization manner. In addition, an upper protocol and lower protocol functions of the base station may be appropriately divided into each of the CU and the DU. Alternatively, the independent NFs may be implemented in a fixed manner without being virtualized as in the case of an LTE communication scheme. Of course, the performance of detailed functions for each NF may be different from the performance of the corresponding function of LTE.

In particular, 5G carriers need to optimally build and operate various types of 5G base stations depending on wireless data traffic demand, coverage demand, equipment price, and cell site environment. Further, when a base station using a millimeter-wave frequency is used, there is a burden that a large number of small cells must be constructed by a provider. Therefore, flexibility through multi-vendor compatibility needs to be secured. For this purpose, it is necessary to separate the CU and the DU from each other using the fronthaul interface as in the above-described embodiment, and the CU and the DU between different vendors also need to be operated to be compatible. In view of the above-described necessity, the embodiments of the present disclosure propose a method and device for dynamically configuring the NFs of a CU and a DU using a standardized fronthaul interface.

As described above, in the 5G communication environment, arrangement of various base station functions and base station separation structures according to the arrangement may be used according to a scenario of establishing a wireless network of a provider. Various base station separation structures may exist, and the base station separation structure may be configured differently according to vendors or settings. Therefore, it is necessary to dynamically configure the NFs of the CU or DU so that the CU may implement the function of the base station through the DU having various structures and the fronthaul interface. Hereinafter, a method for configuring the NF in terms of the CU will be described for convenience of understanding, but it is obvious that the operation in terms of the DU or a terminal from the same technical idea is also included in the scope of the present disclosure.

Figure 2:
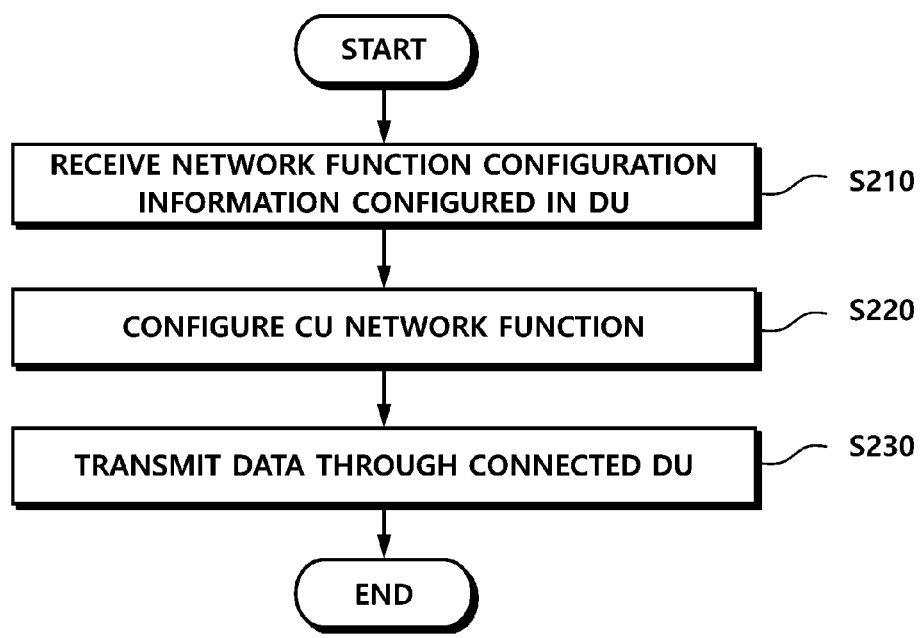
FIG. 2 is a diagram illustrating operations of a central unit (CU) according to an embodiment.

FIG. 2 is a diagram illustrating operations of a CU according to an embodiment.

Referring to FIG. 2, in operation S210, a CU according to an embodiment of the present disclosure receives network function configuration information of a DU connected to the CU using a fronthaul interface. For example, the CU may be connected to the DU via the fronthaul interface. The CU may receive the network function configuration information of the corresponding DU from one or more DUs connected through the fronthaul interface.

The network function configuration information may include information about a network function configured in the corresponding DU. For example, the network function configuration information may include at least one piece of DU type information, DU identification information, network function identification information, and network function set identification information. The DU type information in which a predetermined type is classified for each network function configured in the DU may include information about the corresponding type. The DU identification information refers to unique information for identifying the DU. The network function identification information refers to information for identifying an individual network function, and the network function set identification information refers to identification information for grouping one or more network functions into a set and distinguishing them. In addition, the network function configured in the DU may be transmitted to the CU in various forms.

The CU may verify the network function configured in each of the DUs by using the network function configuration information of the DU. The network functions included in each of the DUs may be configured variously for each of the DUs or for each of the settings of the DUs. Accordingly, the CU receives the network function configuration information from each of the DUs, verifies information of the DUs having various forms, and configures the network function of the CU using the verified information to provide the base station function to a terminal together with the DU.

In addition, in operation S220, the CU configures the network function of the CU based on the network function configuration information of the DU. The CU may dynamically configure the network function of the CU by verifying the received network function configuration information of the DU. For example, the CU may verify the network function configured in the DU and may configure the network function of the CU based on the network function which is not configured in the DU.

For example, the DU may configure at least one network function among RLC, MAC, and PHY network functions. The CU may configure at least one network function among RRC, PDCP, RLC and MAC network functions. In this manner, the network functions that are configured in the DU and the CU may be partially overlapped. On the other hand, the CU or the DU may include a network function management entity that manages the activation operation of network functions or network sub-functions. In addition, both the CU and the DU may include a fronthaul interface network function for managing the fronthaul interface. The fronthaul interface network function may calculate and allocate the bandwidth of the fronthaul.

In addition, in operation S230, the CU transmits data to a terminal through the DU. The CU configures a network function to correspond to the DU and may transmit and receive data to and from the terminal through the DU. For example, the CU may transmit a data packet to be transmitted to the terminal to the DU using the fronthaul interface, and the DU may process the corresponding data packet and transmit the processed data packet to the terminal. Similarly, the DU may receive data from the terminal, may process the data packet through the network function, and may transmit the processed data packet to the CU. The CU is connected to a core network through a backhaul interface. Accordingly, the CU is able to process data of the terminal. In this manner, the CU and the DU connected to each other through the fronthaul interface perform one base station function. However, a separated structure into the CU and the DU is formed and various types of CUs and DUs are configured, so that it is possible to configure a base station capable of dynamically providing compatibility while satisfying more diverse 5G requirements.

Hereinafter, the above-described network function configuration of the CU will be described in detail with reference to the drawings.

Figure 3:
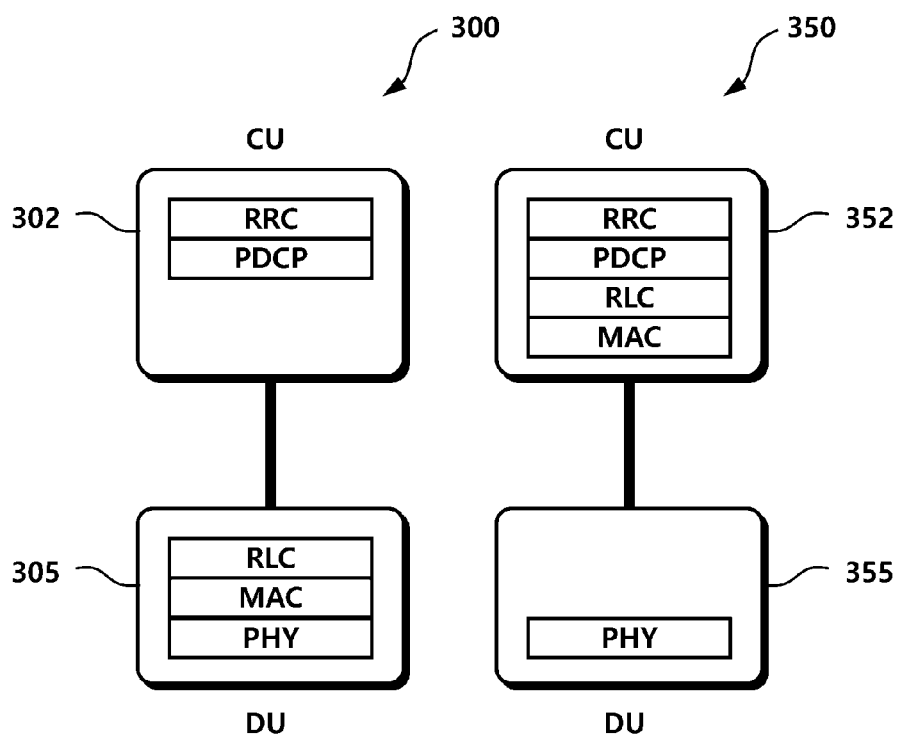
FIG. 3 is a diagram illustrating various structures of a base station including a CU and a distributed unit (DU) according to an embodiment.

FIG. 3 is a diagram illustrating various structures of a base station including a CU and a DU according to an embodiment.

A CU and a DU forming a base station may be configured in various types. Referring to FIG. 3, a base station 300 including a CU 302 and a DU 305 has a type 1 separation structure. In the type 1 separation structure of the base station 300, the CU 302 includes RRC and PDCP network functions, and a DU 305 includes RLC, MAC, and PHY network functions. Alternatively, a base station 350 including a CU 352 and a DU 355 has a type 2 separation structure. In the type 2 separation structure of the base station 350, the CU 352 includes RRC, PDCP, RLC, and MAC network functions, and the DU 355 includes only a PHY network function. In addition, if necessary, some functions that allow non-real-time processing of RLC or MAC may be distributed and arranged in the CU, and some functions that require real-time processing may be distributed and arranged in the DU.

In this manner, the CUs 302 and 352 may include at least one network function of the RRC, PDCP, RLC, and MAC network functions, and the DUs 305 and 355 may include at least one of the RLC, MAC, and PHY network functions. Alternatively, in the case of an integrated device with an RF and an antenna mounted therein, the RF may be included and configured in the DU. Accordingly, various types of base station separation structures other than the above-described base station 300 of the type 1 separation structure and base station 350 of the type 2 separation structure may be implemented. For example, since RLC and MAC layers have similar packet processing functions such as packet combining (PacketConcatenation, Multiplexing, Assembling, etc.), segmentation (Packet Segmentation, De-multiplexing, etc.), packet reordering, packet retransmission, and the like, the RLC and MAC layers may be integrated into a single layer for high-performance packet processing, or the similar functions may be mutually combined. Alternatively, the specific network function may be removed or may not be used, as needed.

Such a base station separation structure may be variously configured as needed.

For example, the base station 300 of the type 1 separation structure may be more suitable for mmWave base stations for broadband transmission because it is easy to interwork between 5G and LTE/Wi-Fi base station equipment through PDCP and requires small capacity fronthaul data transmission. The base station 350 of the type 2 separation structure may be more suitable for a base station using a frequency of 6 GHz or less because it enables short transmission delay and fast radio resource scheduling, but it requires large capacity fronthaul data transmission.

Meanwhile, a radio resource management (RRM) function may be added to the DUs 305 and 355 separately from the CUs 302 and 352 to support mobility and the like. Alternatively, a network function (e.g., RRC) corresponding to an RAN control plane (CP) may be arranged in both the CUs 302 and 352 and the DUs 305 and 355.

Figure 4:
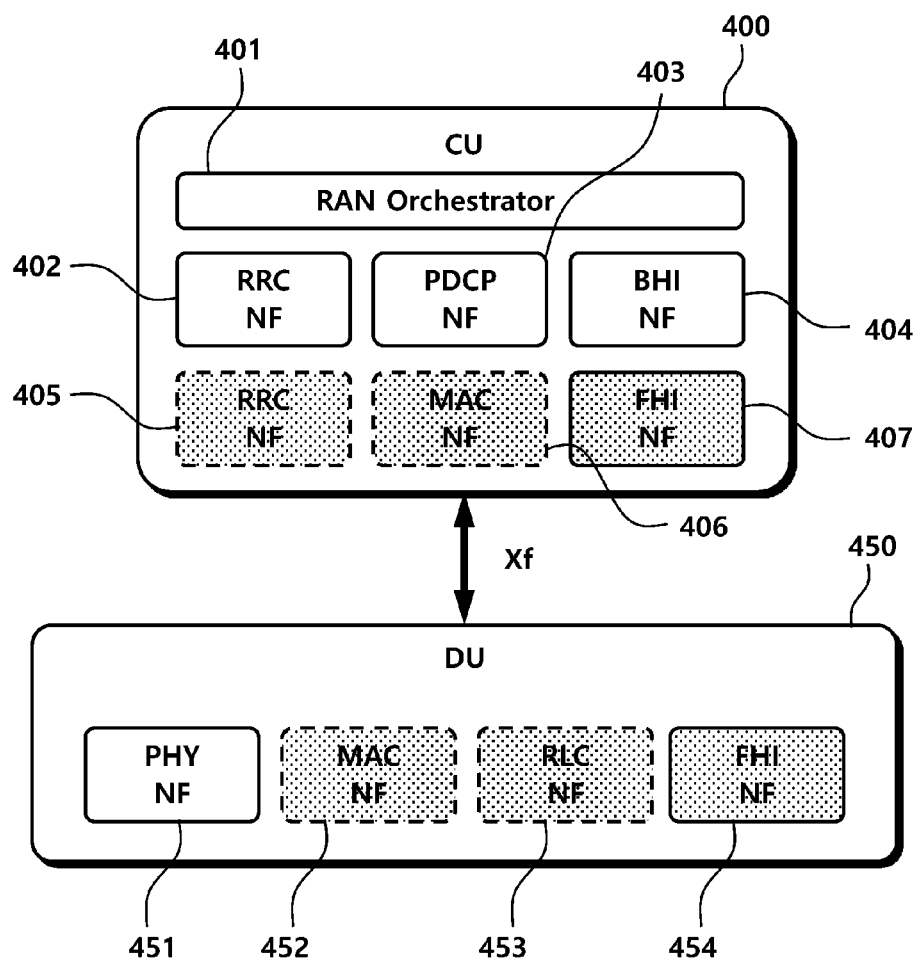
FIG. 4 is an exemplary diagram illustrating a network function configured in a CU and a DU according to an embodiment.

FIG. 4 is an exemplary diagram illustrating network functions configurable in a CU and a DU according to an embodiment.

Referring to FIG. 4, network functions configurable in a CU 400 and a DU 450 will be described. The network functions described above may be configured by a virtualization method. For example, the network functions may be virtualized and implemented as software modules on hardware. The virtualized and implemented network modules may be all or some of the network functions described above.

For example, first, a network virtualization management method of the CU 400 and the DU 450 will be described. The centralized CU 400 includes all or some of RRC 402, PDPC 403, RLC 405, and MAC 406 network functions virtualized as software modules on high capacity/high performance general purpose base station hardware. The distributed and arranged DU 450 includes all or some of RLC 453, MAC 452, and PHY 451 network functions virtualized as software modules. The network functions of the DU 450 may be implemented with dedicated network functions that are not virtualized. In addition, fronthaul interface (FHI) network functions 407 and 454 for processing a fronthaul interface module may be configured in both the CU 400 and the DU 450.

The fronthaul interface is a point-to-point logical interface between the CU 400 and the DU 450. The fronthaul interface may exchange signaling information and perform data transmission. User plane (UP) data may be transmitted through GTP-U, and a CP Xf application protocol (AP) may be transmitted through SCTP or the like.

The detailed main functions of the fronthaul interface network functions 407 and 454 are as follows:

Network function virtualization management of CU and DU

Inter-DU mobility management

Control and management signaling transmission between CU and DU and

User plane bearer or flow control between CU and DU

Packet mapping and format conversion

Load management

Error handling

Meanwhile, the CU 400 further includes a backhaul interface (BHI) network function 404 for performing backhaul interface processing between a core network and the CU 400 or between the CUs. For example, the CU 400 may include an entity or function for performing processing of a backhaul interface between the CU and the core network or a backhaul interface between the CU and another CU. That is, the CU 400 may be an end point of the backhaul interface.

In addition, the CU 400 or the DU 450 may include a network function management entity that manages the activation operation of network functions or network sub-functions. The network function management entity may be implemented in a software manner through virtualization or may be configured as a separate entity. In FIG. 4, the network function management entity is described as a radio access network (RAN) orchestrator 401. The RAN orchestrator 401 may perform a function of dynamically controlling network function installation of the CU 400 and the DU 450, and resource allocation and management. The RAN orchestrator 401 may be arranged only in the CU 400 or in both the CU 400 and the DU 450.

Meanwhile, one network function may include a plurality of network sub-functions (NSFs). Also, dynamic control of the NSF unit may be performed. For example, control such as activation and deactivation of packet header compression NSF existing in the PDCP network function or packet combining/segmentation/reordering/retransmission NSF existing in the RLC network function may be possible according to used scenario, service requirements, and data types. The NSF may be divided into detailed functions of the network functions and configured, or the NSF may be set according to user settings or the like.

As described above, each of the CU and the DU may configure various network functions. As described above, the network functions of the CU and the DU may be variously changed according to the separation structure type of the base station, and the base station separation structure may be variously set according to the vendor.

For example, 1) the CU and the DU of different vendors may be configured with the same network function arrangement, or 2) the CU and the DU of different vendors may be configured with different network function arrangements. In the case of 1), since the connected CU and DU have the same network function configuration although they have different venders, the CU and the DU may be configured in the same manner as in the base station 300 of the type 1 separation structure of FIG. 3. In the case of 2), since the CU and the DU have a different network function configuration, a case in which the DU 355 of the base station 300 of the type 1 separation structure is connected to the CU 352 of the base station 350 of the type 2 separation structure of FIG. 3 may occur. In this case, unnecessary duplication of the network functions or omission of the network functions may occur, and information exchange using the fronthaul interface may not be smoothly performed.

Therefore, when another type of DU is connected to the CU as in the case of 2), there is a need for a procedure for configuring or reconfiguring the network function of the CU using the network function configuration information for the DU. The CU includes all base station network functions or necessary network functions for interworking with other types of DUs, and the necessary network functions may be dynamically configured through virtualization.

Figure 5:
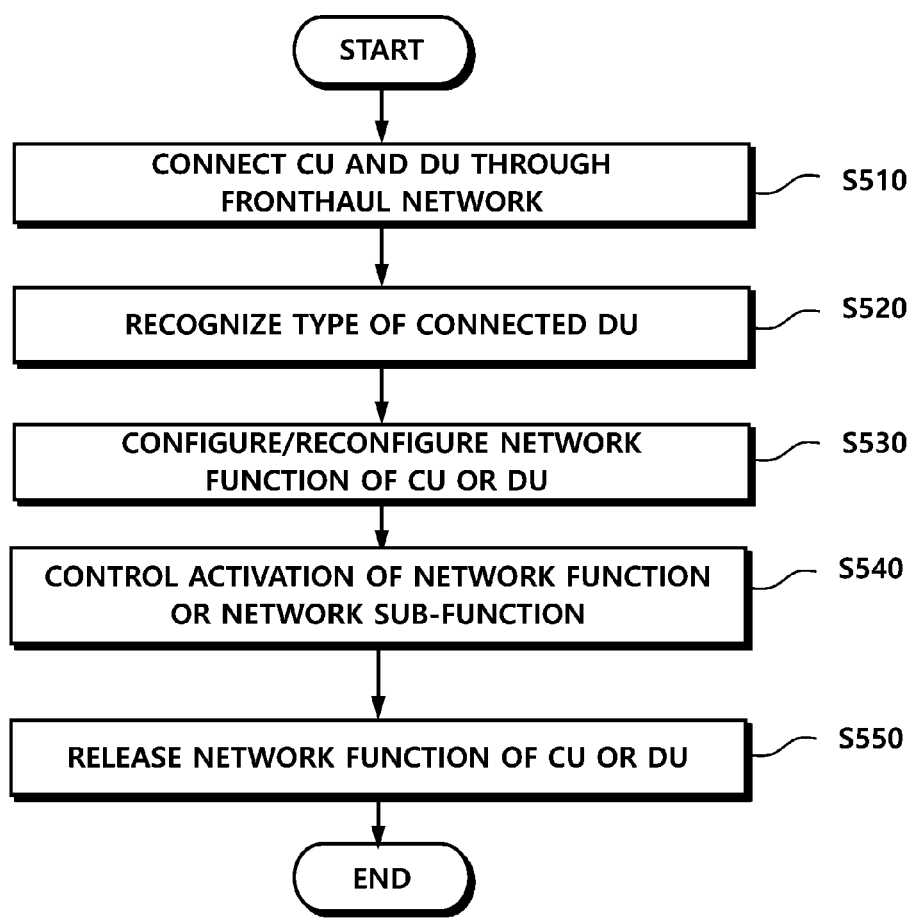
FIG. 5 is a flowchart illustrating a network function configuration operation of a CU or a DU according to an embodiment.

FIG. 5 is a flowchart illustrating a network function configuration operation of a CU or a DU according to an embodiment.

As described above, the CU according to the present embodiment may dynamically configure the network function using the network function configuration information of the DU.

Referring to FIG. 5, in operation S510, the CU establishes a connection with the DU through the fronthaul interface. For example, a connection between the CU and the DU may be established through the fronthaul interface (Xf) between the CU and the DU. To this end, the CU and the DU may configure a fronthaul interface network function.

Next, in operation S520, the CU recognizes the type of the connected DU. For example, the CU may exchange information with the DU via the fronthaul interface and may verify the structure or configuration of the connected DU using the exchanged information. As described above, the DU may configure some or all of the network functions according to the vendor or setting, and the CU may obtain configuration information for the network function configured in the DU through the fronthaul interface.

In operation S530, the CU may configure or reconfigure necessary network functions based on the network function configuration information of the connected DU. For example, the CU controls and manages the necessary network functions not to overlap the network functions configured in the DU among the virtualized network functions. In addition, the CU may calculate and allocate a fronthaul bandwidth required between the connected CU and DU through the fronthaul interface network function. Also, the CU may control data transmission between CU and DU. If necessary, the CU may reconfigure the network function of the DU.

In operation S540, the CU controls activation of the network function or the network sub-function. For example, the CU may virtualize and configure various network functions and may activate or deactivate some network functions using the network function configuration information of the connected DU. Alternatively, the CU may perform an activation or deactivation control operation in a sub-functional unit of each network function. For example, a packet combining and segmentation portion of the RLC network function may be set as the sub-function, and whether the corresponding sub-function is activated may be determined and controlled.

In operation S550, when the use of the network function is completed, the CU may release resources of unnecessary network functions. If necessary, the CU may release the network function of the DU. Here, when the entire network functions in the DU are activated or deactivated, the entire DU may be processed as being active (or connected) or inactive (or disconnected).

In the above, the procedure for configuring or reconfiguring the network functions of the CU or the DU using the network function configuration information of the DU to which the CU is connected has been described.

Meanwhile, a terminal may be required to perform data communication even while moving, and seamless data transmission according to the movement of the terminal may be required to be performed even in the 5G communication environment. Therefore, when the CU and the DU configure the network functions as described above, the DU or the CU may be changed according to the movement of the terminal.

In this case, as described above, the DU or the CU may have a different network function configured according to venders or settings, and therefore the CU may need to reconfigure or newly configure the network function in a handover process for supporting the mobility of the terminal. Hereinafter, the network function configuration of the CU and the DU according to the handover of the terminal will be described with reference to the drawings.

Figure 6:
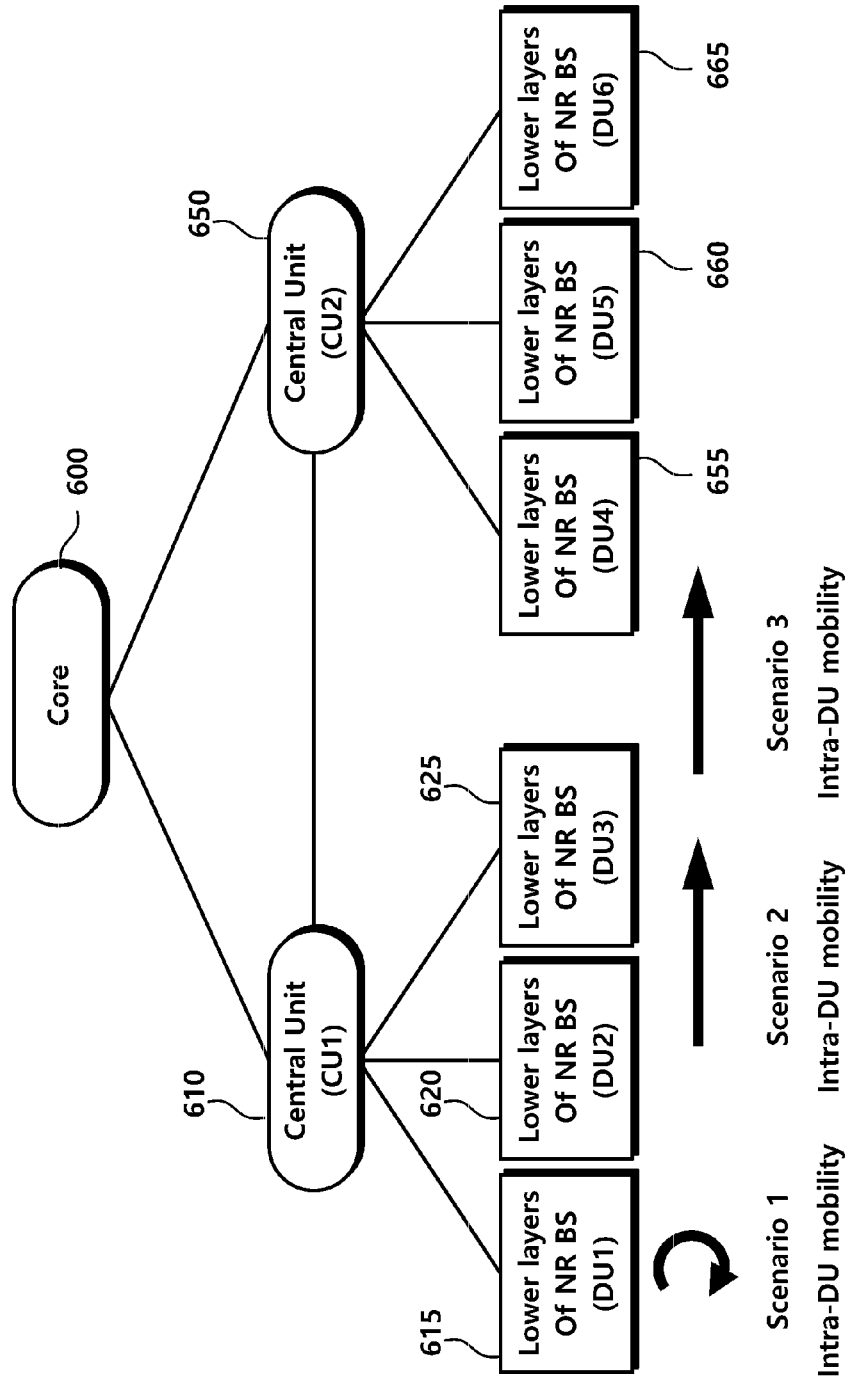
FIG. 6 is a diagram illustrating a handover scenario of a terminal according to an embodiment.

FIG. 6 is a diagram illustrating a handover scenario of a terminal according to an embodiment.

Referring to FIG. 6, a core network 600 may be connected to a CU 1 610 and a CU 2 650. The connection between the core network 600 and the CUs 610 and 650 may be established through a backhaul interface.

The CU 1 610 may establish a connection with a DU 1 615, a DU 2 620, and a DU 3 625 through the fronthaul interface, and the CU 2 650 may also be connected to a DU 4 655, a DU 5 660, and A DU 6 665 through the fronthaul interface. Here, the CU and each of the DUs may be configured with different network functions.

Three scenarios may be considered when considering the mobility of the terminal. The first scenario 1 is a case where the terminal performs Intra-DU movement in the same DU 1 615. In this case, the terminal may perform a procedure such as reconnection to the DU 1 615. The second scenario 2 is a case where the terminal moves from the DU 2 620 to the DU 3 625. The second scenario 2 is an inter-DU movement situation, and the terminal performs a handover procedure for DU change. If the network function configurations of the DU 2 620 and the DU 3 625 are different, the network function reconfiguration of the CU 1 610 may be required in the handover procedure of the UE. The third scenario 3 is an Inter-CU movement situation, and both the CU and the DU are changed according to the movement of the terminal. For example, there is a possibility that the terminal connected to the CU 1 610 and the DU 3 625 and transmitting/receiving data is moved and connected to the CU 2 650 and the DU 4 655. In this case, the terminal performs a handover procedure, and the network functions of the CU and the DU may be reconfigured as needed.

Hereinafter, when a handover occurs due to the movement of a terminal between different DUs through the fronthaul interface (Xf) among the above-described scenarios will be described. When a handover occurs between the DUs connected in the same CU, the network function configuration of the DU may be different according to venders or settings, and therefore the CU needs to be handled in accordance with the handover procedure.

Figure 7:
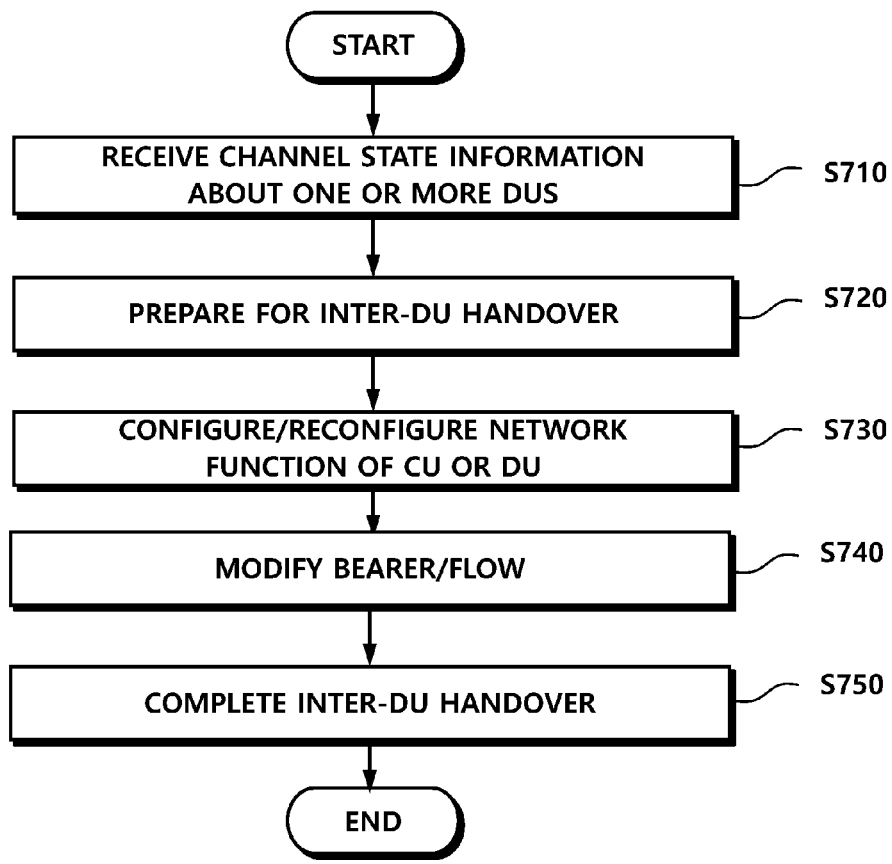
FIG. 7 is a flowchart illustrating operations of a CU for a handover of a terminal according to an embodiment.

FIG. 7 is a flowchart illustrating operations of a CU for a handover of a terminal according to an embodiment.

Referring to FIG. 7, in operation S710, the CU receives channel state information for one or more DUs. The channel state information may include a result of measuring beam or cell quality for a serving DU and a neighboring DU. The channel state information may also include identification information for each of the CU and the DU. Alternatively, the channel state information may include information about the type of network function configuration for each of the CU and DU. The CU may receive the channel state information transmitted by the terminal through a source DU.

In operation S720, the CU determines an inter-DU handover of the terminal based on the channel state information and performs a preparation operation. The CU may determine a target DU to be connected to the terminal in consideration of at least one of location information of the terminal, the channel state information, and data processing capacity.

In operation S730, the CU receives network function configuration information of a target DU and configures or reconfigures the network function of the CU or DU using the received network function configuration information. For example, the CU may reconfigure the network function of the CU as needed based on the network function configuration information of the target DU. Also, the bandwidth of the fronthaul interface for connecting the CU to the target DU may be reset.

Next, the CU requests a handover of the terminal, and the terminal performs a random access procedure through the target DU to perform a handover.

If necessary, the CU may determine a data bearer or a flow change. In operation S740, the CU requests a change in the data bearer or the flow from the target DU and performs the change procedure. For example, the CU requests a data bearer or flow modification from the target DU. Wireless bearer information, wireless flow information, and an identifier (ID) may be used for the modification request. If conversion and mapping between the bearer and the flow are further required, the CU may perform the conversion and mapping.

The terminal performs a random access procedure through the target DU, and the target DU allocates necessary radio resources to the terminal. Next, the terminal informs the CU of the completion of the handover of the DU through the target DU.

In operation S750, the CU releases the radio resources of the terminal connected to the source DU and completes the inter-DU handover of the terminal.

Figure 8:
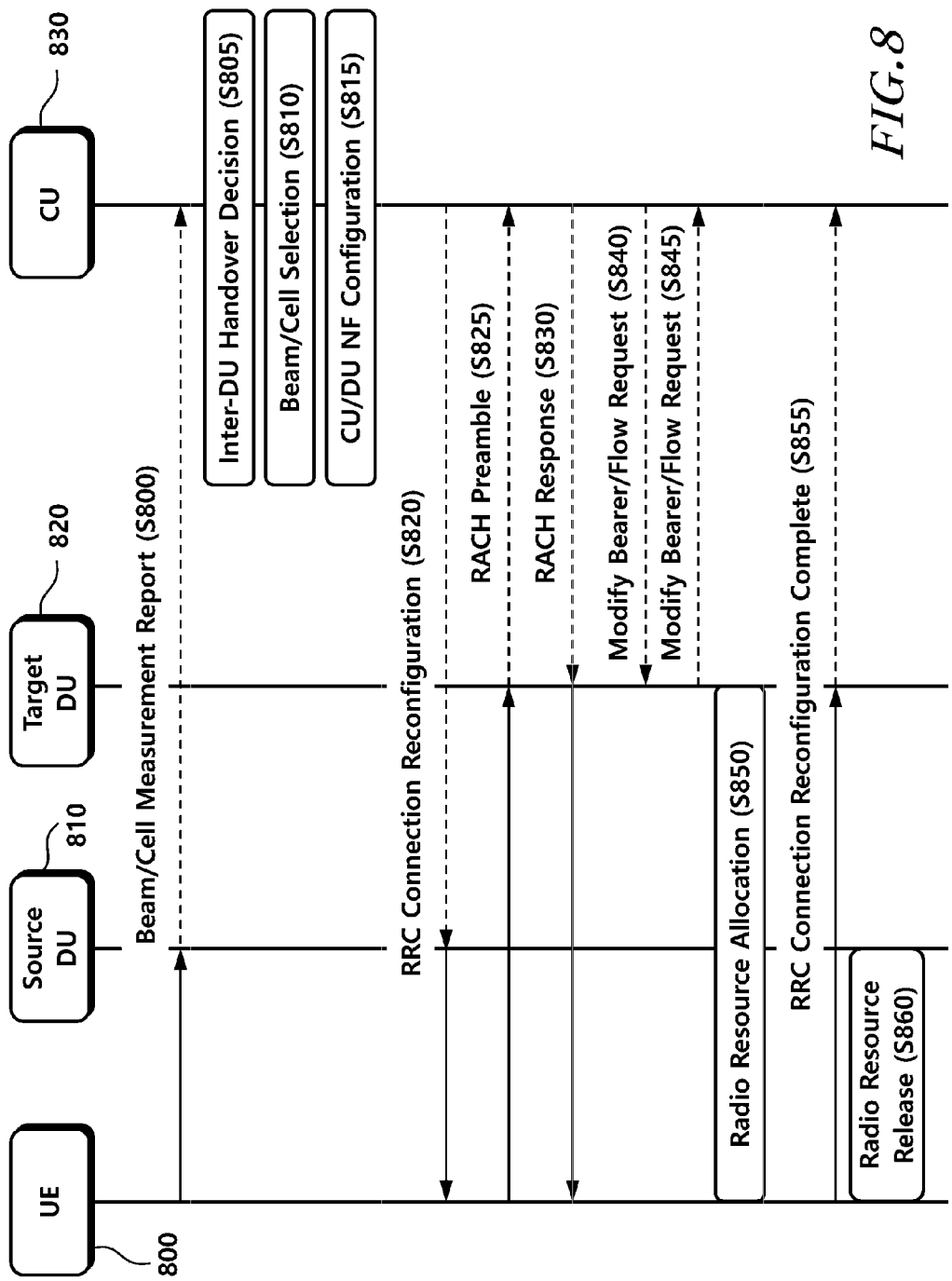
FIG. 8 is a signal diagram illustrating an inter-DU handover operation of a terminal according to an embodiment.

FIG. 8 is a signal diagram illustrating an inter-DU handover operation of a terminal according to an embodiment.

Referring to FIG. 8, the inter-DU handover procedure of the terminal will be described once again using the signal diagram. In FIG. 8, the exchange of information through the fronthaul interface is indicated by a dotted line.

In operation S800, a terminal 800 reports beam and cell measurement results of a serving DU and neighboring DUs through a source DU 810 to a CU 830. The measurement result may be included in channel status information and transmitted. In addition, a CU ID and a DU ID, which are unique identifiers of the CU 830 and the DUs 810 and 820, may be used. Alternatively, CU_TYPE and DU_TYPE values may be included to indicate the device type of the CU 830 and the DUs 810 and 820, and the CU 830 may classify the network function configurations using the type information. When beamforming transmission is supported at the terminal and the base station, a plurality of beam information and measurements in the DU may be additionally performed, and measurement results may be included and transmitted to the CU 830.

In operation S805, the CU 830 determines the necessity of the inter-DU handover according to the beam and cell measurement results. The CU 830 may comprehensively consider the information received in operation S800, a data request amount of the individual terminal, and a data throughput of the entire network in order to determine the inter-DU handover.

In operation S810, the CU 830 selects the beam or cell of the target DU 820 for optimal connection. For example, the CU may perform determination based on information such as an optimal cell, a candidate cell, an optimal beam, a beam pair, and a candidate beam between the cell and the terminal, and a beam pair, a cell ID, a beam ID, a beam pair ID, and the like.

In operation S815, the CU 830 may configure the network function of the CU 830 as needed based on the collected network function configuration information of the target DU 820. Also, the CU 830 may change transmission data through the fronthaul interface according to the network function configuration. The CU 830 may use the type of the target DU 820 or individual network function identification information in verifying the network function configuration information of the target DU 820. For example, an RAN NF ID that may identify an RAN network function (NF) may be used. Alternatively, an NF set IDs of the CU 830 and the DUs 810 and 820 may be used. Alternatively, an RAN NSF ID that may identify an individual RAN network sub-function (NSF) may also be used. Here, when the NF set ID is differently set, the NFs included for each of the NF set IDs are differently configured. In addition, the CU 830 may use a predefined FH Bandwidth ID to select and configure the optimized fronthaul bandwidth with the target DU 820 as the network function is configured or reconfigured. Specifically, FH_BW_ID1 is defined as 10 Gbps and FH_BW_ID2 is defined as 100 Gbps, so that transmission bandwidth support may be distinguished.

In operation S820, the CU 830 requests the inter-DU handover from the terminal 800. For example, an inter-DU handover request may be transmitted via an RRC connection reconfiguration message. Here, the handover may include an Inter-cell or -beam handover. The inter-DU handover request is transmitted via the source DU 810.

In operation S825, the terminal 800 performs a random access procedure in the CU 830 through the target DU 820. For example, the terminal 800 transmits an RACH preamble message to the CU 830 via the target DU 820.

In operation S830, the CU 830 transmits a response message for the random access procedure to the terminal through the target DU 820. For example, the response message to the random access procedure may be an RACH response to the RACH preamble transmitted by the terminal 800.

If necessary, when a change in the data bearer and/or the flow is required, the CU 830 may request change of a data bearer and/or flow modification from the target DU 820 in operation S840. To this end, at least one of wireless bearer information, wireless flow information, and ID information is used. In addition, if conversion and mapping between the bearer and the flow are required, the CU 830 performs the conversion and mapping.

In operation S845, the target DU 820 transmits a response message to the request for the data bearer and/or flow modification to the CU 830.

In operation 850, the target DU 820 performs radio resource allocation required for the corresponding terminal 800.

In operation S855, the terminal 800 informs the CU 830 of the completion of the inter-DU handover through the target DU 820. Information related to handover completion may be included in an RRC connection reconfiguration complete message.

In operation S860, when the inter-DU handover is completed, the radio resource of the terminal 800 connected to the source DU 810 is released.

As described above, even when the base station based on a large number of virtualized servers is utilized in order to stably provide various transmission speeds, reliability, delay requirements, and various services in a 5G communication environment, more stable connectivity may be provided by effective interworking between the CU and DU of different venders through the fronthaul interface design inside an open base station and construction/operation costs may be reduced.

The structure of the CU will be briefly described once again.

Figure 9:
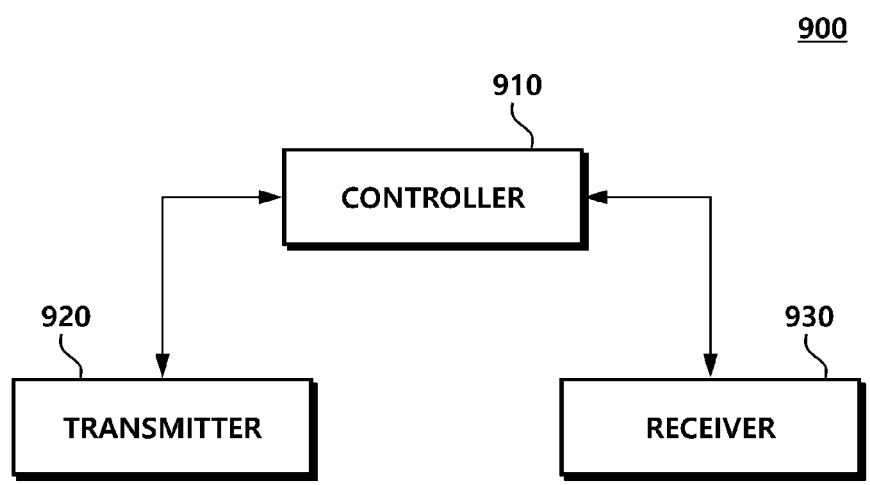
FIG. 9 is a diagram illustrating a structure of a CU according to an embodiment.

FIG. 9 is a diagram illustrating a structure of a CU according to an embodiment.

Referring to FIG. 9, a CU 900 according to an embodiment includes a receiver 930 configured to receive network function configuration information of a DU connected to the CU by using a fronthaul interface; a controller 910 configured to configure a network function of the CU on the basis of the network function configuration information of the DU; and a transmitter 920 configured to transmit data to the terminal through the DU.

As described above, the DU and the CU may respectively configure some or all of the network functions, and the controller 910 may dynamically configure the network functions of the CU according to the network function configuration of the DU.

Meanwhile, the network function configuration information of the DU may include at least one piece of DU type information, DU identification information, network function identification information, and network function set identification information.

The controller 910 may include a network function management entity that manages the activation operation of network functions or network sub-functions. Further, the controller 910 may calculate and allocate the bandwidth of the fronthaul that connects the CU and the DU using the fronthaul interface network function. In addition, the controller 910 controls the overall operation of the CU 900 required to perform a function of an interlocking interface of a fronthaul section between the CU and the DU according to the above-described embodiments.

Meanwhile, the receiver 930 may further receive channel state information for one or more DUs from the terminal. In this case, the controller 910 may determine the inter-DU handover of the terminal based on the channel state information and may reconfigure the network function of the CU based on the network function information configured in the target DU.

In addition, the transmitter 920 and the receiver 930 are used to transmit and receive signals, messages, and data necessary for performing the above-described embodiments to and from the terminal, the DU, and the core network.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of a central unit (CU) for communicating with a terminal, the method comprising:
   receiving network function configuration information of a distributed unit (DU) connected to the CU by using a fronthaul interface;
   configuring at least one network function of the CU based on the network function configuration information of the DU; and
   transmitting data to the terminal through the DU,
   wherein the method comprises:
      receiving channel state information about one or more DUs from the terminal;
      determining an inter-DU handover of the terminal based on the channel state information; and
      reconfiguring the network function of the CU based on network function information configured in a target DU.

2. The method as claimed in claim 1, wherein the DU configures at least one network function of radio link control (RLC), medium access control (MAC), and physical link (PHY) network functions.

3. The method as claimed in claim 1, wherein the CU configures at least one network function of radio resource control (RRC), packet data convergence protocol (PDCP), radio link control (RLC), and medium access control (MAC) network functions.

4. The method as claimed in claim 1, wherein the network function configuration information of the DU comprises at least one piece of DU type information, DU identification information, network function identification information, and network function set identification information.

5. The method as claimed in claim 1, wherein one of the CU and the DU comprises a network function management entity that manages an activation operation of the network function or a network sub-function.

6. The method as claimed in claim 1, wherein a fronthaul interface network function configured in the CU calculates and allocates a bandwidth of a fronthaul connecting the CU and the DU.

7. The method as claimed in claim 1, wherein the CU comprises a backhaul interface processing function between the CU and a core network.

8. A central unit (CU) for communicating with a terminal, the CU comprising:
   a receiver for receiving network function configuration information of a distributed unit (DU) connected to the CU by using a fronthaul interface;
   a controller for configuring at least one network function of the CU based on the network function configuration information of the DU; and
   a transmitter for transmitting data to the terminal through the DU,
   wherein:
      the receiver receives channel state information about one or more DUs from the terminal, and
      the controller determines an inter-DU handover of the terminal based on the channel state information, and reconfigures the network function of the CU based on network function information configured in a target DU.

9. The CU as claimed in claim 8, wherein the DU configures at least one network function of radio link control (RLC), medium access control (MAC), and physical link (PHY) network functions.

10. The CU as claimed in claim 8, wherein the CU configures at least one network function of radio resource control (RRC), packet data convergence protocol (PDCP), radio link control (RLC), and medium access control (MAC) network functions.

11. The CU as claimed in claim 8, wherein the network function configuration information of the DU comprises at least one piece of DU type information, DU identification information, network function identification information, and network function set identification information.

12. The CU as claimed in claim 8, wherein one of the CU and the DU comprises a network function management entity that manages an activation operation of the network function or a network sub-function.

13. The CU as claimed in claim 8, wherein a fronthaul interface network function configured in the CU calculates and allocates a bandwidth of a fronthaul connecting the CU and the DU.

14. The CU as claimed in claim 8, wherein the controller performs backhaul interface processing between the CU and a core network.

* * * * *